UNITED STATES PATENT OFFICE.

HENRY S. CROOKE AND LEWIS CROOKE, OF NEW YORK, N. Y.

MANUFACTURE OF METALLIC FOIL.

SPECIFICATION forming part of Letters Patent No. 227,495, dated May 11, 1880.

Application filed September 8, 1879.

*To all whom it may concern:*

Be it known that we, HENRY SUYDAM CROOKE and LEWIS CROOKE, both of the city, county, and State of New York, have made an invention of a new and useful manufacture of what we term "Silver-Surfaced Embossed Metallic Foil" and an improvement in the art of manufacturing metallic foil; and we do hereby declare that the following is a full, clear, and exact description and specification of the same.

Previous to our present invention tin-foil with a whitened or dead surface has been produced. Metallic tin-foil has also been produced with a bright or burnished surface.

One part of our invention consists of a new species of metallic foil, characterized by the peculiarities that its surface is both white, or of a dead silvery appearance, and is also embossed in an ornamental figure.

In order that the first part of the invention may be understood, and also the improvement in the art which constitutes the second part of the invention, we will proceed to describe the manner in which we manufacture our new foil.

The material of which the foil is made may be varied; but that which we prefer is lead (or an alloy of it) faced with commercially-pure tin, the facing and core being welded together by rolling the two in contact.

The material is reduced to foil by the usual means and process employed for that purpose, the reducing process which we use being that of rolling the metal between smooth-surfaced rollers of steel or chilled iron.

As, however, the means and process of rolling foil are well understood, it is not deemed necessary to describe them in detail.

The foil when thus produced is of about the thickness required for the finished article. Then the burnished foil is passed between a pair of rollers, the surfaces of one or both of which are matted, so as to mat the surface of the foil, the rollers being pressed together with sufficient force to cause the minute inequalities of the surface of the matting-roller to impress themselves in the foil.

The rollers which we have used practically for this operation of our process are made of chilled iron, and after their barrels are ground true they are etched by means of weak acid, so as to produce an etched or mat surface.

The acid used for etching may be weak muriatic acid, or some other acid or mixture of acids that will produce the desired result.

The mat-surface produced upon the foil by this operation has a silvery-white appearance, but the surface is practically smooth to the touch.

The next step of our process is to subject the mat-surfaced foil to the action of a pair of embossing-rolls whose surfaces are cut or engraved to an ornamental pattern or design which is the counterpart of that which is to be produced upon the surfaces of the foil. The rollers are pressed together with the requisite force to indent their cut surfaces into the tin-foil.

The foil produced by the above operations is not only embossed in a pattern or design, but the surfaces of both the projections and indentations of the design present a silvery-white mat-surface.

If the foil be made wholly of lead the surface is not as silvery as when the surface of the foil is of tin; but it resembles silver more nearly than a burnished surface of the same metal, and is a more valuable article for useful purposes, on account of its greater whiteness and ornamental appearance.

The silver-surfaced embossed foil manufactured as above set forth is a superior article for the manufacture of wrappers for tobacco and other articles; and it is not only highly ornamental, but is also impervious to air, water, and grease.

We claim as our invention—

1. As a new article of manufacture, silver-surfaced embossed metallic foil with its surface both matted and embossed in a pattern, substantially as before set forth.

2. The improvement in the art of manufacturing metallic foil, substantially as before set forth, consisting of the following operations, in the order named: first, the matting of the surface of metallic foil; and, second, the embossing in a pattern of the foil after its surface is matted.

Witness our hands.

HENRY SUYDAM CROOKE.
LEWIS CROOKE.

Witnesses:
H. P. WEST,
A. I. DALTON.